US012612480B2

(12) United States Patent
Yamamoto

(10) Patent No.: US 12,612,480 B2
(45) Date of Patent: Apr. 28, 2026

(54) RESIN COMPOSITION, METHOD OF MANUFACTURING ADHESIVE MEMBER FORMED FROM THE RESIN COMPOSITION, AND DISPLAY DEVICE INCLUDING THE ADHESIVE MEMBER

(71) Applicant: Samsung Display Co., Ltd., Yongin-si (KR)

(72) Inventor: Katsuhiro Yamamoto, Yokohama (JP)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 787 days.

(21) Appl. No.: 17/862,984

(22) Filed: Jul. 12, 2022

(65) Prior Publication Data

US 2023/0139019 A1     May 4, 2023

(30) Foreign Application Priority Data

Nov. 3, 2021     (KR) ......................... 10-2021-0149782

(51) Int. Cl.
| | |
|---|---|
| *C08F 222/10* | (2006.01) |
| *C08F 2/48* | (2006.01) |
| *C08F 220/18* | (2006.01) |
| *C08F 220/20* | (2006.01) |
| *C08F 220/28* | (2006.01) |
| *C09J 133/08* | (2006.01) |

(52) U.S. Cl.
CPC .......... *C08F 222/1065* (2020.02); *C08F 2/48* (2013.01); *C08F 220/1808* (2020.02); *C08F 220/20* (2013.01); *C08F 220/281* (2020.02);

*C08F 220/282* (2020.02); *C09J 133/08* (2013.01); *C09J 2203/318* (2013.01)

(58) Field of Classification Search
None
See application file for complete search history.

(56) References Cited

U.S. PATENT DOCUMENTS

| | | | | |
|---|---|---|---|---|
| 8,552,132 | B2 * | 10/2013 | Ghosh | ...................... C09D 5/04 |
| | | | | 526/260 |
| 9,169,422 | B2 * | 10/2015 | O'Hare | ................... C09J 133/14 |
| 9,855,742 | B2 | 1/2018 | Miura et al. | |
| 11,898,066 | B2 * | 2/2024 | Fujiwara | ................ C09J 175/16 |
| 2013/0088542 | A1 | 4/2013 | Hisanaga | |
| 2018/0118982 | A1 * | 5/2018 | Campbell | .............. C09J 133/08 |
| 2021/0087417 | A1 | 3/2021 | Takahashi et al. | |

(Continued)

FOREIGN PATENT DOCUMENTS

| | | |
|---|---|---|
| JP | 2011189664 A | 9/2011 |
| JP | 2012237965 A | 12/2012 |
| JP | 2013091774 A | 5/2013 |

(Continued)

*Primary Examiner* — Sanza L. McClendon
(74) *Attorney, Agent, or Firm* — CANTOR COLBURN LLP

(57) ABSTRACT

A resin composition includes: at least two monofunctional (meth)acrylates, at least one bifunctional (meth)acrylate, and at least one photoinitiator. The resin composition has a shear viscosity of about 8 mPa·s to about 50 mPa·s as measured at a temperature of about 25° C. according to JIS Z8803, and an apparent extensional viscosity of about 100 mPa·s or less under conditions of the temperature of about 25° C. and a Hencky strain of about 6.

17 Claims, 7 Drawing Sheets

(56) References Cited

U.S. PATENT DOCUMENTS

2021/0214482 A1 * 7/2021 Morita .................. C08F 226/06

FOREIGN PATENT DOCUMENTS

| | | | | |
|---|---|---|---|---|
| JP | 5692494 | B2 | 4/2015 | |
| JP | 2017210578 | A | 11/2017 | |
| JP | 6573089 | B1 | 9/2019 | |
| JP | 6735494 | B2 | 8/2020 | |
| JP | 2020172649 | A | 10/2020 | |
| JP | 2021046497 | A | 3/2021 | |
| KR | 101557601 | B1 * | 7/2014 | |
| KR | 1020180002769 | A | 1/2018 | |
| KR | 1020200139623 | A | 12/2020 | |
| KR | 1020210076600 | A | 6/2021 | |
| WO | WO-2014088936 | A1 * | 6/2014 | .............. B05D 1/02 |
| WO | 2019230697 | A1 | 12/2019 | |

* cited by examiner

DD-1

WP
AP-a
PP
AP
DM

DD-2

WP
AP-a
PP
PIB
TP
AP
DP

RESIN COMPOSITION, METHOD OF MANUFACTURING ADHESIVE MEMBER FORMED FROM THE RESIN COMPOSITION, AND DISPLAY DEVICE INCLUDING THE ADHESIVE MEMBER

This application claims priority to Korean Patent Application No. 10-2021-0149782, filed on Nov. 3, 2021, and all the benefits accruing therefrom under 35 U.S.C. § 119, the content of which in its entirety is herein incorporated by reference.

BACKGROUND

The present disclosure herein relates to a resin composition, a method for manufacturing an adhesive member formed from the resin composition, and a display device including the adhesive member.

Various display devices used for multimedia devices such as a television, a mobile phone, a tablet computer, a navigation system, and a game machine are being developed. In order to facilitate portability and improve user convenience, display devices which are foldable, bendable, or rollable by being provided with bendable flexible display members are being developed.

Each of members used in a flexible display device is desirable to secure reliability during a folding or bending operation. In addition, an adhesive resin used for forming an adhesive layer applied to display device in various shapes is desirable to have excellent discharge stability for members of various types of display devices.

SUMMARY

The present disclosure provides a resin composition having excellent discharge stability and exhibiting high adhesion properties after curing, and a method for preparing an adhesive member formed from the resin composition.

The present disclosure also provides a display device having excellent reliability by including an adhesive member having high adhesion properties.

An embodiment of the present invention provides a resin composition including: at least two monofunctional (meth)acrylates, at least one bifunctional (meth)acrylate, and at least one photoinitiator, where the resin composition has a shear viscosity of about 8 millipascal seconds (mPa·s) to about 50 mPa·s as measured at a temperature of about 25 degrees in Celsius (° C.) according to JIS Z8803, and an apparent extensional viscosity of greater than 0 mPa·s and less than or equal to about 100 mPa·s under the conditions of a temperature of about 25° C. and a Hencky strain of about 6.

In an embodiment, the resin composition may satisfy Equation 1 below.

$$Y_1/Y_2 < 12 \qquad \text{[Equation 1]}$$

In Equation 1 above, $Y_1$ is a maximum value of the apparent extensional viscosity of the resin composition as measured at a temperature of about 25° C., and $Y_2$ is the shear viscosity of the resin composition as measured at a temperature of about 25° C. according to JIS Z8803.

In an embodiment, the sum of weights of the monofunctional (meth)acrylates may be about 80 percentages by weight (wt %) to about 90 wt % based on the total weight of the resin composition.

In an embodiment, the bifunctional (meth)acrylate may include a urethane (meth)acrylate having a weight average molecular weight of about 10000 to less than 40000.

In an embodiment, the weight of the bifunctional (meth) acrylate may be about 10 wt % to about 20 wt % based on the total weight of the resin composition.

In an embodiment, the monofunctional (meth)acrylates may each independently include at least one of 4-hydroxy-butyl acrylate, 2-ethylhexyl acrylate, tetrahydrofurfuryl acrylate, or 2-ethylhexyl-diglycol acrylate.

In an embodiment, when a discharge pressure is applied to the resin composition, the resin composition may have a first discharge rate, after the discharge pressure is removed and then about 60 seconds to about 300 seconds elapse, the discharge pressure is re-applied to the resin composition, when the discharge pressure is re-applied, the resin composition may have a second discharge rate, and an amount of change in the second discharge rate with respect to the first discharge rate may be greater than 0% and less than or equal to about 20 percentages (%).

In an embodiment, the first discharge rate and the second discharge rate may each independently be about 5.5 meters per second (m/s) to 6.5 m/s.

In an embodiment, after ultraviolet curing, the resin composition may have a 180° peel may be about 800 gf/25 mm or greater, wherein the 180° peel force may be a peel force for a polymer substrate.

In an embodiment, after ultraviolet curing, the resin composition may have a storage modulus of about 0.05 megapascals (MPa) to less than 0.2 MPa as measured at about –20° C. according to JIS K7244-7.

In an embodiment of the present invention, a method for manufacturing an adhesive member includes: providing a resin composition including at least two monofunctional (meth)acrylates, at least one bifunctional (meth)acrylate, and at least one photoinitiator on a substrate using a discharge device; and providing light to the resin composition to form an adhesive member. When a discharge pressure is applied to the resin composition from the discharge device, the resin composition has a first discharge rate, and when the discharge pressure is removed, and then the discharge pressure is again applied to the resin composition after about 60 seconds to about 300 seconds elapse, the resin composition has a second discharge rate. An amount of change in the second discharge rate with respect to the first discharge rate is greater than 0% and less than or equal to about 20%.

In an embodiment, the resin composition may have a shear viscosity of about 8 mPa·s to about 50 mPa·s as measured at a temperature of about 25° C. according to JIS Z8803, and an apparent extensional viscosity of greater than 0 mPa·s and less than or equal to about 100 mPa·s under the conditions of a temperature of about 25° C. and a Hencky strain of about 6.

In an embodiment, the first discharge rate and the second discharge rate may each be about 5.5 m/s to about 6.5 m/s.

In an embodiment of the present invention, a display device includes: a display panel, a window disposed on the display panel, and an adhesive member disposed between the display panel and the window. The adhesive member includes a polymer derived from a resin composition including at least two monofunctional (meth)acrylates, at least one bifunctional (meth)acrylate, and at least one photoinitiator. The resin composition has a shear viscosity of about 8 mPa·s to about 50 mPa·s as measured at a temperature of about 25° C. according to JIS Z8803, and an apparent extensional viscosity of greater than 0 mPa·s and less than or equal to about 100 mPa·s under the conditions of a temperature of about 25° C. and a Hencky strain of about 6.

In an embodiment, the resin composition may satisfy Equation 1 below.

$$Y_1/Y_2 < 12 \qquad \text{[Equation 1]}$$

In Equation 1 above, $Y_1$ is a maximum value of the apparent extensional viscosity of the resin composition as measured at a temperature of about 25° C., and $Y_2$ is the shear viscosity of the resin composition as measured at a temperature of about 25° C. according to JIS Z8803.

In an embodiment, the sum of weights of the monofunctional (meth)acrylates may be about 80 wt % to about 90 wt % based on the total weight of the resin composition.

In an embodiment, the bifunctional (meth)acrylate may include a urethane (meth)acrylate having a weight average molecular weight of about 10000 to less than 40000.

In an embodiment, the adhesive member may have a storage modulus of about 0.05 MPa to less than about 0.2 MPa as measured at about –20° C. according to JIS K7244-7, and a 180° peel force of about 800 gf/25 mm or greater for a polymer substrate.

In an embodiment, the adhesive member may be formed by providing the resin composition on one surface of the window or on one surface of the display panel, and then photocuring the resin composition.

In an embodiment, the display device may include at least one folding region, wherein the folding region may have a radius of curvature of greater than 0 mm and less than or equal to about 5 millimeters (mm).

BRIEF DESCRIPTION OF THE FIGURES

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION

Figure 1A:
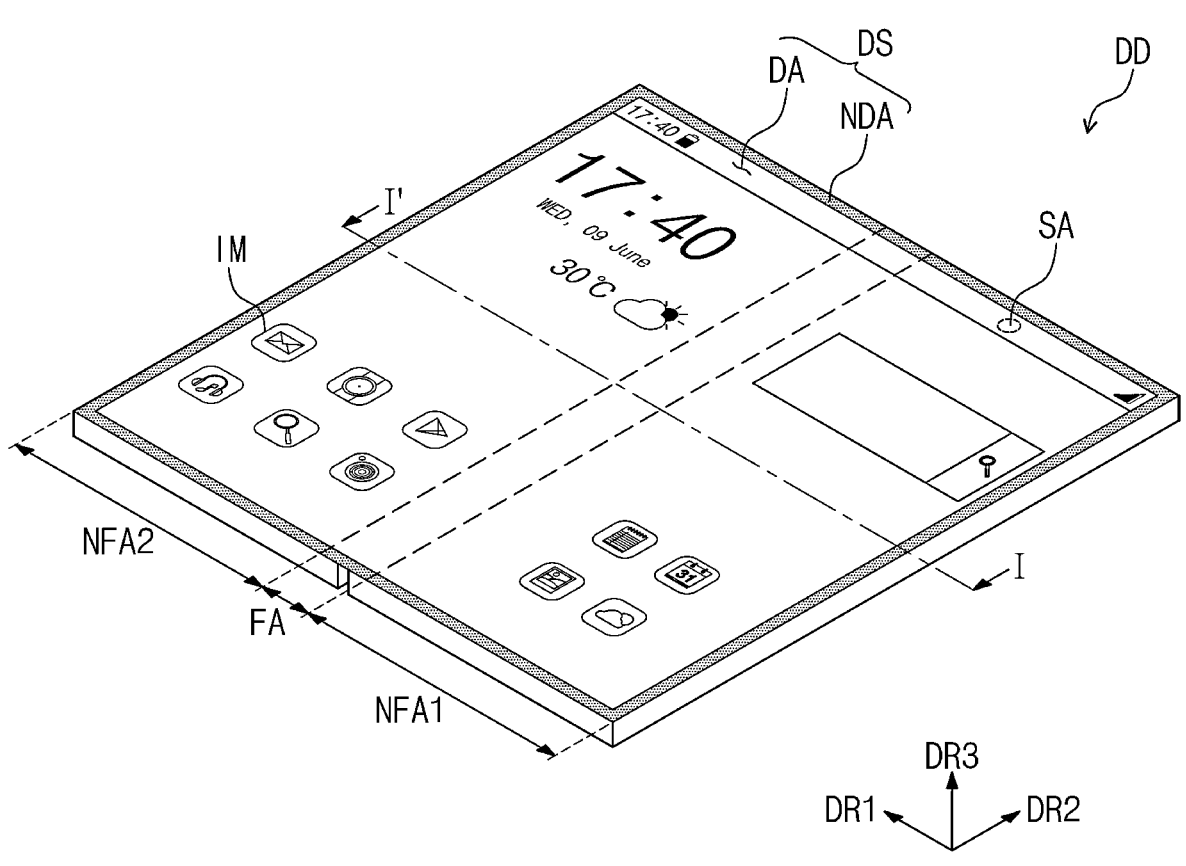
FIG. 1A is a perspective view of a display device of an embodiment.

The present invention may be modified in many alternate forms, and thus specific embodiments will be exemplified in the drawings and described in detail. It should be understood, however, that it is not intended to limit the present invention to the particular forms disclosed, but rather, is intended to cover all modifications, equivalents, and alternatives falling within the spirit and scope of the invention.

In the present disclosure, when an element (or a region, a layer, a portion, and the like) is referred to as being "on," "connected to," or "coupled to" another element, it means that the element may be directly disposed on/connected to/coupled to the other element, or that a third element may be disposed therebetween.

Like reference numerals refer to like elements. Also, in the drawings, the thickness, the ratio, and the dimensions of elements are exaggerated for an effective description of technical contents. The term "and/or," includes all combinations of one or more of which associated components may define.

It will be understood that, although the terms "first," "second," etc. may be used herein to describe various elements, these elements should not be limited by these terms. These terms are only used to distinguish one element from another. For example, a first element may be referred to as a second element, and a second element may also be referred to as a first element in a similar manner without departing the scope of rights of the present invention. The terms of a singular form may include plural forms unless the context clearly indicates otherwise.

In addition, terms such as "below," "lower," "above," "upper," and the like are used to describe the relationship of the components shown in the drawings. The terms are used as a relative concept and are described with reference to the direction indicated in the drawings.

It should be understood that the terms "comprise," or "have" are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the present invention pertains. It is also to be understood that terms such as terms defined in commonly used dictionaries should be interpreted as having meanings consistent with the meanings in the context of the related art, and should not be interpreted in too ideal a sense or an overly formal sense unless explicitly defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Hereinafter, a resin composition of an embodiment and a display device of an embodiment will be described with reference to the accompanying drawings.

Figure 1B:
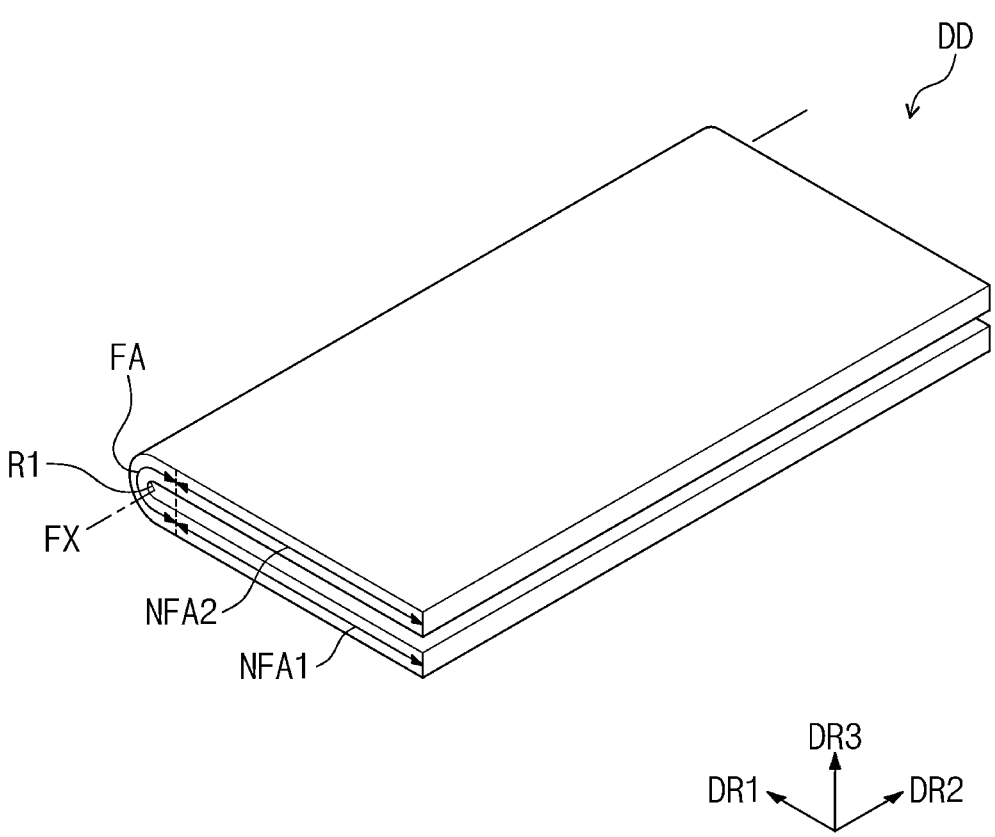
FIG. 1B is a view illustrating the display device illustrated in FIG. 1A in a folded state.

FIG. 1A is a perspective view of a display device of an embodiment. FIG. 1B is a view illustrating the display device illustrated in FIG. 1A in a folded state. A display device DD according to an embodiment may be a flexible display device which may be foldable or bendable, or which may be maintained to be in a folded state or bent state. In the present specification, being flexible refers to having properties of being able to be bent, which may not be limited to a structure of being bent and completely folded, but may include a structure of being bent to a degree of a few nanometers (nm).

Referring to FIG. 1A and FIG. 1B, the display device DD may be a device activated in accordance with an electrical signal. For example, the display device DD may be a personal digital terminal, a tablet computer, a car navigation system unit, a game console, or a wearable device, but is not limited thereto. In FIG. 1A and FIG. 1B, the display device DD is exemplarily illustrated as a portable electronic device.

Referring to FIG. 1A, the display device DD according to an embodiment may include a display surface DS defined by a first direction axis DR1 and a second direction axis DR2 crossing the first direction axis DR1. The display device DD may provide an image IM to a user through the display surface DS.

The display surface DS may include a display region DA and a non-display region NDA adjacent to the display region DA. The display region DA may display the image IM, and the non-display region NDA may not display the image IM. The non-display region NDA may surround the display region DA. However, the embodiment of the present invention is but are not limited thereto. The shape of the display region DA and the shape of the non-display region NDA may be changed.

The display surface DS may further include a sensing region SA. The sensing region SA may be a part of the display region DA. The sensing region SA may have a transmittance higher than that of the display region DA. Through the sensing region SA, an optical signal, for example, visible light or infrared light may move. The display device DD may include an electronic module which captures an external image through the visible light passing through the sensing region SA, or determines proximity of an external object through the infrared light. In FIG. 1A, one sensing region SA is exemplarily illustrated, but the embodiment of the present invention is not limited thereto. The sensing region SA may be provided in plurality.

The thickness direction of the display device DD may be a direction parallel to a third direction axis DR3, which is a normal direction with respect to a plane defined by the first direction axis DR1 and the second direction axis DR2. Directions indicated by the first to third direction axes DR1, DR2, and DR3 described in the present specification are a relative concept, and may be converted into different directions. In addition, the directions indicated by the first to third direction axes DR1, DR2, and DR3 may be described as first to third directions, and may be denoted by the same reference numerals. In the present specification, the first direction axis DR1 and the second direction axis DR2 are perpendicular to each other, and the third direction axis DR3 may be a normal direction with respect to a plane defined by the first direction axis DR1 and the second direction axis DR2.

The display device DD may include a folding region FA and a plurality of non-folding regions NFA1 and NFA2. The non-folding regions NFA1 and NFA2 may include a first non-folding region NFA1 and a second non-folding region NFA2. The first non-folding region NFA1, the folding region FA, and the second non-folding region NFA2 may be sequentially disposed parallel to the first direction axis DR1.

The display device DD of FIG. 1A and FIG. 1B is illustrated as including one folding region FA and two non-folding regions NFA1 and NFA2, but the number of folding regions and the number of non-folding regions are not limited thereto. For example, a display device may include three or more non-folding regions and two or more folding regions disposed between adjacent non-folding regions.

As illustrated in FIG. 1B, the folding region FA may be folded with respect to a folding axis FX parallel to the second direction axis DR2. The folding region FA may have a predetermined curvature and a predetermined radius of curvature R1. For example, the radius of curvature R1 of the folding region FA may be greater than 0 mm and less than or equal to about 5 millimeters (mm).

When the display device DD is folded, the non-folding regions NFA1 and NFA2 may face each other. When the display device DD is completely folded, the display surface DS may not be exposed to the outside, which may be referred to as in-folding. Although not illustrated, when the display device DD of an embodiment is completely folded, the display surface DS may be exposed to the outside, which may be referred to as outer-folding.

Figure 2:
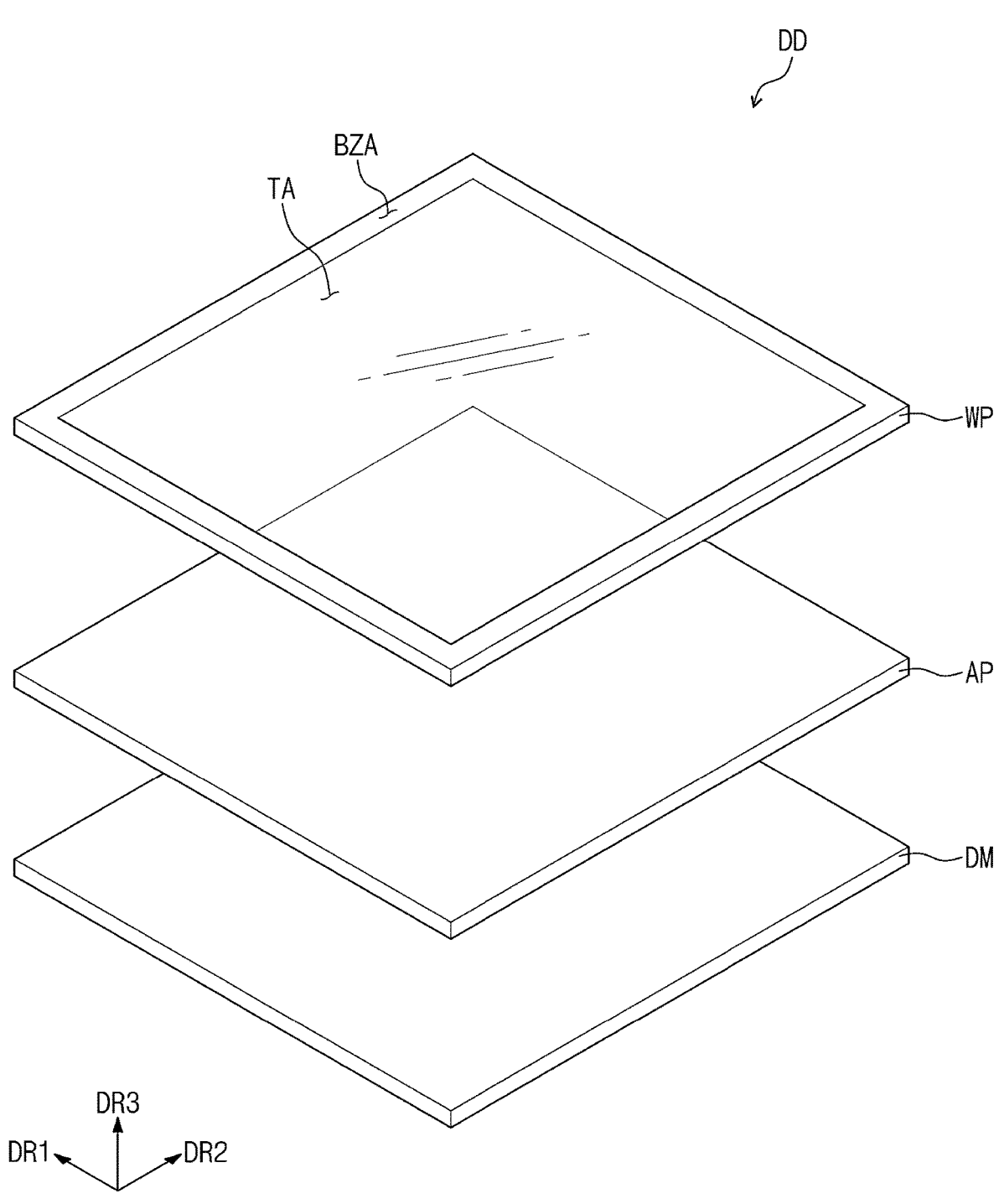
FIG. 2 is an exploded perspective view of a display device of an embodiment.
Figure 3:
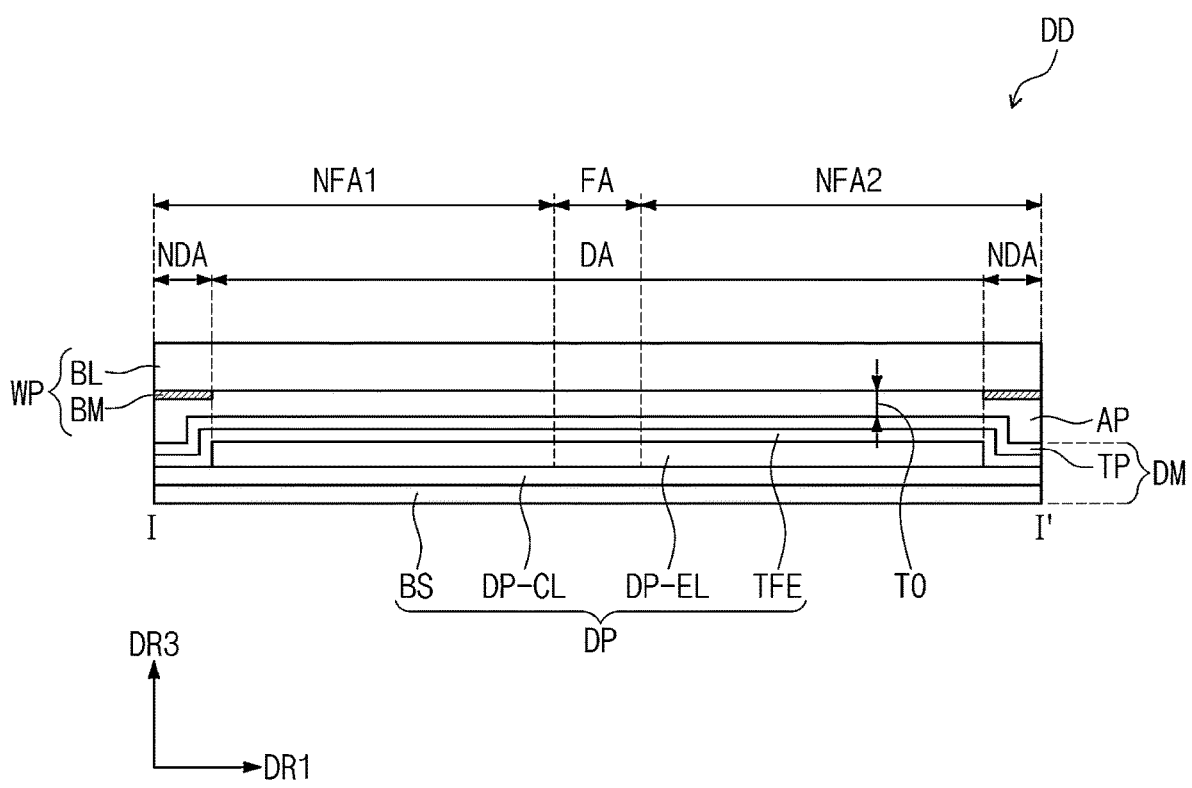
FIG. 3 is a cross-sectional view of a display device of an embodiment.

FIG. 2 is an exploded perspective view of the display device DD according to an embodiment. FIG. 3 corresponds to line I-I' of FIG. 1, and is a cross-sectional view of the display device DD according to an embodiment.

The display device DD of an embodiment may include a display module DM, and a window WP disposed on the display module DM. In the display device DD of an embodiment, the display module DM may include a display panel DP including a display element layer DP-EL and an input sensing unit TP disposed on the display panel DP. The display device DD of an embodiment may include an adhesive member AP disposed between the display panel DP and the window WP. For example, the adhesive member AP may be disposed between the input sensing unit TP and the window WP.

The adhesive member AP may include a polymer derived from the resin composition of an embodiment. The resin composition of an embodiment may have an apparent extensional viscosity of greater than 0 mPa·s and less than or equal to about 100 millipascal seconds (mPa·s) under the conditions of a temperature of about 25 degrees in Celsius (° C.) and a Hencky strain of about 6. The resin composition of an embodiment may have a shear viscosity of about 8 mPa·s to about 50 mPa·s as measured at a temperature of about 25° C. according to JIS Z8803. When the initial length of a specimen is a first length, and the length of the specimen stretched in one direction is a second length, the Hencky strain is a value obtained by dividing the second length by the first length and taking a natural logarithm. As used herein, JIS Z8803 is a published Japanese Industrial Standard regarding methods for viscosity measurement of liquid.

The resin composition having an apparent extensional viscosity of greater than 0 mPa·s and less than or equal to about 100 mPa·s under the conditions of a temperature of about 25° C. and a Hencky strain of about 6 may be easily discharged from a device used for applying a resin composition. In addition, the resin composition having an apparent extensional viscosity of 100 mPa·s or less under the conditions of a temperature of 25° C. and a Hencky strain of 6 may maintain a uniform discharge rate and a uniform discharge amount. Meanwhile, the resin composition having an apparent extensional viscosity of greater than 100 mPa·s under the conditions of a temperature of 25° C. and a Hencky strain of 6 may not be discharged in an appropriate amount from a device used for applying a resin composition.

The resin composition having a shear viscosity of about 8 mPa·s to about 50 mPa·s as measured at a temperature of about 25° C. according to JIS Z8803 may be easily discharged from a device used for applying a resin composition, and may maintain a uniform discharge rate and a uniform discharge amount. The resin composition having a shear viscosity of less than about 8 mPa·s as measured at a temperature of about 25° C. according to JIS Z8803 may flow when the resin composition is provided, so that it may be difficult to form an adhesive member to a uniform thickness when the adhesive member is formed. On the other hand, the resin composition having a shear viscosity of greater than 50 mPa·s as measured at a temperature of 25° C. according to JIS Z8803 may not be discharged in an appropriate amount from a device used for applying a resin composition.

The resin composition of an embodiment may satisfy Equation 1 below. Equation 1 may be an equation representing the relationship between the apparent extensional viscosity of a resin composition and the shear viscosity of a resin composition at a temperature of 25° C.

$$Y_1/Y_2 < 12 \qquad \text{[Equation 1]}$$

In Equation 1, $Y_1$ is a maximum value of the apparent extensional viscosity of the resin composition as measured at a temperature of about 25° C., and $Y_2$ is a shear viscosity of the resin composition as measured at a temperature of about 25° C. according to JIS Z8803. According to Equation 1, the maximum value of the apparent extensional viscosity of the resin composition as measured at a temperature of about 25° C. may be less than 12 times the shear viscosity of the resin composition as measured at a temperature of about 25° C. according to JIS Z8803. The resin composition of an embodiment satisfying Equation 1 is easily discharged from a device used for applying a resin composition, and the adhesive member AP formed from the resin composition may exhibit properties of having high adhesion reliability. In addition, the display device DD including the adhesive member AP formed from the resin composition may exhibit excellent reliability when folding and unfolding are repeated.

For example, the resin composition may be provided by a method such as an inkjet printing method or a dispensing application method. When providing the resin composition, a device may be used to apply the resin composition, and the device used for the application may apply a predetermined amount of discharge pressure to the resin composition. The predetermined amount of discharge pressure may be a pressure which allows the resin composition to be discharged at a uniform rate and in a uniform amount.

When a predetermined amount of discharge pressure is applied to the resin composition, the resin composition may have a first discharge rate. When the discharge pressure is removed, and then the discharge pressure is again applied to the resin composition after about 60 seconds to about 300 seconds have elapsed, the resin composition may have a second discharge rate. In an embodiment, an amount of change in the second discharge rate with respect to the first discharge rate may be greater than 0% and less than or equal to 20 percentages (%). An amount of change in the discharge rate may be a ratio of the difference between the first discharge rate and the second discharge rate. The first discharge rate and the second discharge rate may be same or different. When the first discharge rate and the second discharge rate are different, the difference in rate therebetween may be 20% or less.

For example, the first discharge rate and the second discharge rate may each independently be about 5.5 meters per second (m/s) to about 6.5 m/s. When the first discharge rate is 5.5 m/s, and the second discharge rate is 6.5 m/s, an amount of change in the second discharge rate with respect to the first discharge rate may be about 18.2%. On the other hand, when the first discharge rate is 6.5 m/s, and the second discharge rate is 5.5 m/s, an amount of change in the second discharge rate with respect to the first discharge rate may be about 15.3%.

That is, the second discharge rate of the resin composition may be a discharge rate at the time when the discharge of the resin composition is resumed after the resin composition is discharged at a first discharge rate and then the discharge of the resin composition is stopped for a predetermined period of time. The resin composition having an amount of change of about 20% or less in the second discharge rate with respect to the first discharge rate may exhibit stable discharge properties. Accordingly, the resin composition may be discharged at a uniform rate and in a uniform amount from a device used for applying a resin composition.

The resin composition of an embodiment may be cured by light. More specifically, a liquid resin composition is cured by ultraviolet light, and may have a storage modulus of about 0.05 megapascals (MPa) to less than about 0.2 MPa at about −20° C. after the ultraviolet curing. The storage modulus at about −20° C. was measured according to JIS K7244-7. In addition, after the ultraviolet curing, the resin composition may have a 180° peel of 800 gf/25 mm or greater for a polymer substrate. For example, "180° peel of 800 gf/25 mm" means that when 180° peel test is applied to a test sample of the resin composition having a width of 25 mm, the resin composition shows characteristic of 800 gram-force. Accordingly, an adhesive layer formed from the resin composition of an embodiment may exhibit properties of having high adhesion reliability. As used herein, "JIS K7244-7" is a published Japanese Industrial Standard for torsional vibration with non-resonant method.

The resin composition of an embodiment may include at least two monofunctional (meth)acrylates, at least one bifunctional (meth)acrylate, and at least one photoinitiator. In the present disclosure, a monofunctional (meth)acrylate refers to a (meth)acrylate including one functional group, and a bifunctional (meth)acrylate refers to a (meth)acrylate including two functional groups. In addition, in the present disclosure, a (meth)acrylate refers to an acrylate or a methacrylate.

The resin composition of an embodiment includes at least two monofunctional (meth)acrylates, and the monofunctional (meth)acrylates may each independently include at least one (meth)acryloyl group. A plurality of monofunctional (meth)acrylates may all be the same or at least one thereof may be different.

Based on the total weight of the resin composition, the sum of weights of the plurality of monofunctional (meth) acrylates may be about 80 percentages by weight (wt %) to about 90 wt %. The resin composition whose sum of weights of monofunctional (meth)acrylates is less than 80 wt % based on the total weight of the resin composition may have high shear viscosity and elongation viscosity, and degraded discharge stability. On the other hand, an adhesive member including a polymer derived from a resin composition whose sum of weights of monofunctional (meth)acrylates is greater than 90 wt % based on the total weight of the resin composition may have low adhesiveness.

For example, monofunctional (meth)acrylates may each independently include at least one of 4-hydroxybutyl acrylate, 2-ethylhexyl acrylate, tetrahydrofurfuryl acrylate, or 2-ethylhexyl-diglycol acrylate. A monofunctional (meth) acrylate may include at least one of a hydroxyl group-containing (meth)acrylate, an alkyl (meth)acrylate, or an alicyclic (meth)acrylate.

The resin composition of an embodiment may include at least one bifunctional (meth)acrylate. For example, a bifunctional (meth)acrylate may include a urethane bond. The resin composition may include, as a bifunctional (meth)acrylate, at least one of UF-C051 (KYOEISHA CHEMICAL Co., Ltd.), UF-C052 (KYOEISHA CHEMICAL Co., Ltd.), UN6207 (Negami Chemical Industrial), or UN6304 (Negami Chemical Industrial).

A bifunctional (meth)acrylate of the resin composition may include a urethane (meth)acrylate having a weight average molecular weight of 10000 to less than 40000. The resin composition including a urethane (meth)acrylate having a weight average molecular weight of 10000 to less than 40000 may satisfy aforementioned Equation 1. The resin composition including a urethane (meth)acrylate having a weight average molecular weight of 10000 to less than 40000 may be easily discharged from a device used for applying a resin composition, and the adhesive member AP formed from the resin composition may exhibit properties of having excellent adhesion reliability.

Based the total weight of resin composition, the weight of the bifunctional (meth)acrylate may be about 10 wt % to about 20 wt %. More specifically, based on the total weight of the resin composition, the weight of the bifunctional (meth)acrylate may be 10 wt % to 15 wt %, more preferably about 11 wt % to about 15 wt %. For example, the resin composition may include a plurality of bifunctional (meth) acrylates, and the sum of weights of the bifunctional (meth) acrylates may be about 10 wt % to about 15 wt % based on the total weight of the resin composition. When the resin composition includes a plurality of bifunctional (meth) acrylates, the plurality of bifunctional (meth)acrylates may each independently have a weight average molecular weight of about 10000 to about 30000.

In an embodiment, the resin composition may include one o bifunctional (meth)acrylate, and the weight of the one bifunctional (meth)acrylate may be about 10 wt % to about 15 wt % based on the total weight of the resin composition. When the resin composition includes one bifunctional (meth)acrylate, the one bifunctional (meth)acrylate may have a weight average molecular weight of greater than about 30000 to about 40000. However, this is only exemplary. The weight average molecular weight of a bifunctional (meth)acrylate, and the weight of a bifunctional (meth)acrylate based on the total weight of the resin composition are not limited thereto.

The resin composition of an embodiment may include at least one photoinitiator. When the resin composition includes a plurality of photoinitiators, different photoinitiators may be activated by ultraviolet light with different center wavelengths.

For example, the photoinitiator may include at least one of 2,2-dimethoxy-1,2-diphenylethan-1-one, 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, or 2-hydroxy-1-{4-[4-(2-hydroxy-2-methyl-propionyl)-benzyl]-phenyl}-2-methylpropan-1-one.

In addition, the photoinitiator may include at least one of 2-methyl-1[4-(methylthio)phenyl]-2-morpholinopropan-1-one, 2-benzyl-2-dimethylamino-1- (4-morpholinophenyl)-butanone-1, 2-dimethylamino-2-(4-methyl-benzyl)-1-(4-morpholin-4-yl-phenyl)-butan-1-one, 2,4,6-trimethylbenzoyl-diphenylphosphine oxide, ethyl(2,4,6-trimethylbenzoyl)phenyl phosphinate, bis(2,4,6-trimethylbenzoyl)-phenylphosphineoxide, [1-(4-phenylsulfanylbenzoyl)heptylideneamino]benzoate, [1-[9- ethyl-6-(2-methylbenzoyl)carbazol-3-yl]ethylideneamino] acetate, or bis(2,4- cyclopentadienyl)bis [2,6-difluoro-3-(1-pyrryl)phenyl] titanium(IV).

Referring to FIG. 3, the display panel DP may include a base substrate BS, a circuit layer DP-CL disposed on the base substrate BS, a display element layer DP-EL disposed on the circuit layer DP-CL, and an encapsulation layer TFE covering the display element layer DP-EL. For example, the display panel DP may include a plurality of organic light emitting elements or a plurality of quantum dot light emitting elements in the display element layer DP-EL. The circuit layer DP-CL may include a plurality of transistors.

The configuration of the display panel DP is illustrative, and the configuration of the display panel DP is not limited to what is illustrated in FIG. 3 and the like. For example, the display panel DP may include a liquid crystal element, in which case the encapsulation layer TFE may be omitted.

The input sensing unit TP may be disposed on the display panel DP. For example, the input sensing unit TP may be directly disposed on the encapsulation layer TFE of the display panel DP. The input sensing unit TP senses an external input and changes the same into a predetermined input signal, and may provide the input signal to the display panel DP. For example, in the display device DD of an embodiment, the input sensing unit TP may be a touch sensing unit configured to sense a touch. The input sensing unit TP may recognize a direct touch of a user, an indirect touch of a user, a direct touch of an object, an indirect touch of an object, or the like.

In an embodiment, the input sensing unit TP may sense at least one of the position of a touch and the intensity (pressure) of a touch, which are applied externally. The input sensing unit TP may have various configurations, or may be composed of various materials, and is not limited to any one embodiment. The input sensing unit TP may include a plurality of sensing electrodes (now shown) configured to sense an external input. The sensing electrodes (not shown) may sense an external input in an electrostatic capacitive manner. The display panel DP is provided with an input signal from the input sensing unit TP, and may generate an image corresponding to the input signal.

The window WP may protect the display panel DP, the input sensing unit TP, and the like. The image IM generated in the display panel DP may transmit the window WP and be provided to a user. The window WP may provide a touch surface of the display device DD. In the display device DD including the folding region FA, the window WP may be a flexible window.

The window WP may include a base layer BL and a print layer BM. The window WP may include a transmissive region TA and a bezel region BZA. The front surface of the window WP including the transmissive region TA and the bezel region BZA corresponds to the front surface of the display device DD.

The transmissive region TA may be an optically transparent region. The bezel region BZA may be a region having a relatively low light transmittance compared to the transmissive region TA. The bezel region BZA may have a predetermined color. The bezel region BZA is adjacent to the transmissive region TA, and may surround the transmissive region TA. The bezel region BZA may define the shape of the transmissive region TA. However, the embodiment is not limited to what is illustrated. The bezel region BZA may be disposed adjacent to only one side of the transmissive region TA, or a portion of the bezel region BZA may be omitted.

The base layer BL may include a glass or plastic substrate. For example, a tempered glass substrate may be used as the base layer BL. Alternatively, the base layer BL may be formed of a polymer resin having flexibility. For example, the base layer BL may be made of polyimide, polyacrylate, polymethylmethacrylate, polycarbonate, polyethylenenaphthalate, polyvinylidene chloride, polyvinylidene difluorid, polystyrene, an ethylene vinylalcohol copolymer, or a combination thereof. However, the embodiment of the present invention is not limited thereto. Any common type known as the base layer BL of the window WP in the art may be used without limitation.

The print layer BM may be disposed on one surface of the base layer BL. In an embodiment, the print layer BM may be provided on a lower surface of the base layer BL which is adjacent to the display module DM. The print layer BM may be disposed in an edge region of the base layer BL. The print layer BM may be an ink print layer. In addition, the print layer BM may be a layer formed by including a pigment or a dye. In the window WP, the bezel region BZA may be a portion in which the print layer BM is provided.

In an embodiment, the window WP may further include at least one functional layer (not shown) provided on the base layer BL. For example, the functional layer (not shown) may be a hard coating layer, an anti-fingerprint layer, and the like, but the embodiment of the present invention is not limited thereto.

The adhesive member AP included in the display device DD of an embodiment may be formed by providing a liquid resin composition on one surface of the window WP or one surface of the display module DM, and by ultraviolet curing the liquid resin composition provided between the window WP and the display module DM. In another embodiment, the adhesive member AP may be provided by ultraviolet curing a liquid resin composition in a separate process to provide the adhesive member AP, followed by laminating one surface of the cured adhesive member AP in the form of an adhesive film on one surface of the window WP or one surface of the display module DM, and then attaching unattached one surface of the window WP or unattached one surface of the display module DM to the other surface of the adhesive member AP.

A thickness T0 of the adhesive member AP may be about 50 micrometers (μm) to about 200 μm. For example, the adhesive member AP may the thickness T0 of about 100 μm to about 150 μm. However, this is exemplary. The thickness T0 of the adhesive member AP is not limited thereto.

Figure 4:
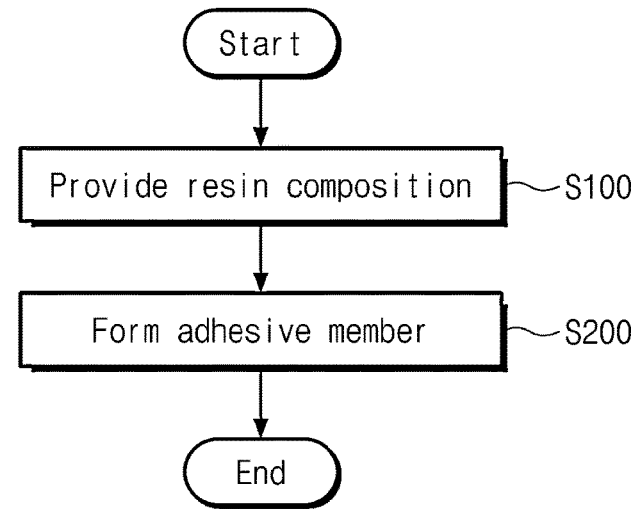
FIG. 4 is a flowchart showing a method for manufacturing an adhesive member of an embodiment.
Figure 5A:
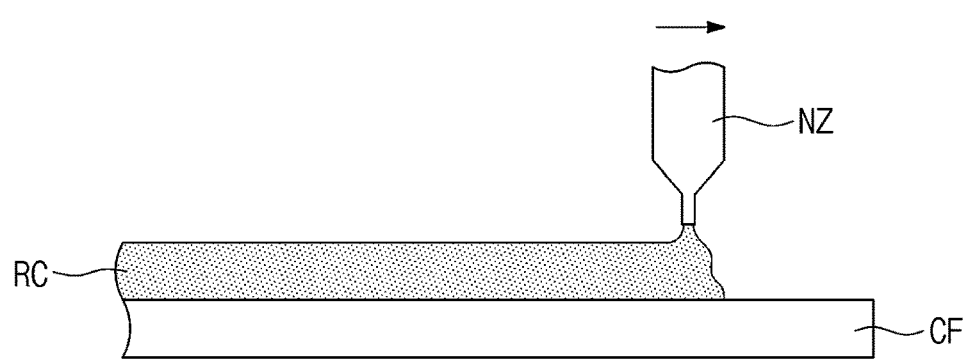
FIG. 5A is a view showing a method for manufacturing an adhesive member of an embodiment.
Figure 5B:
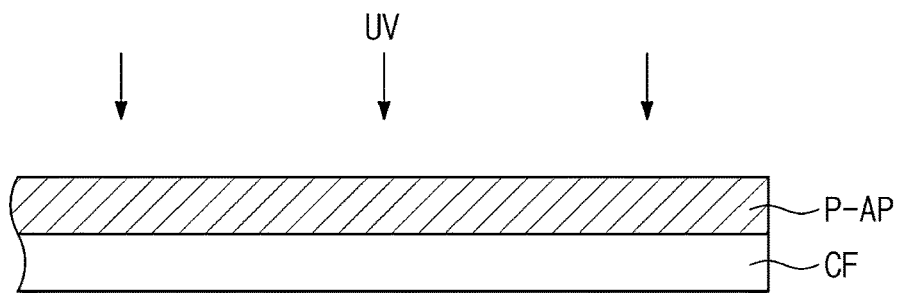
FIG. 5B is a view showing a method for manufacturing an adhesive member of an embodiment.
Figure 5C:
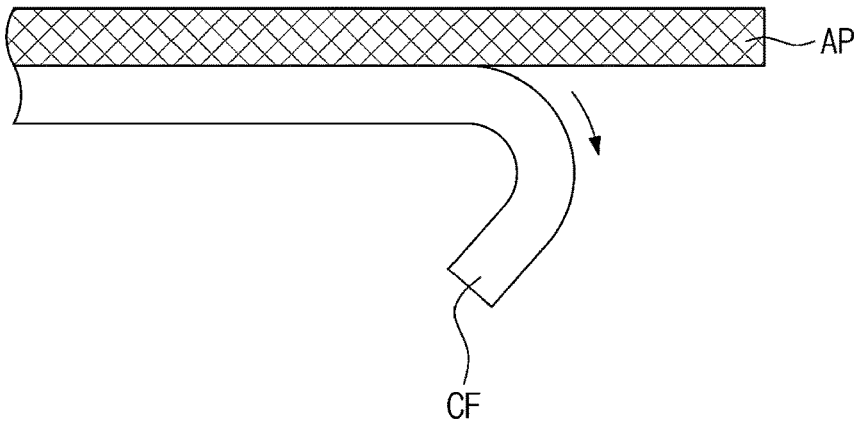
FIG. 5C is a view showing a method for manufacturing an adhesive member of an embodiment.

FIG. 4 is a flowchart showing a method for manufacturing an adhesive member of an embodiment. FIG. 5A to FIG. 5C schematically show steps of a method for manufacturing an adhesive member according to an embodiment.

The method for manufacturing an adhesive member according of an embodiment includes providing a resin composition RC (S100) and forming an adhesive member (S200). Referring to FIG. 5A, a resin composition RC may be provided on a substrate CF. For example, the substrate CF on which the resin composition RC is provided may include polyethylene terephthalate ("PET"). The substrate CF is a temporary substrate used to form the adhesive member AP from the resin composition RC, and may be used without limitation as long as it can be easily detached from the adhesive member AP after curing the resin composition RC. For example, one surface of the substrate CF on which the resin composition RC is provided may be release-treated.

The resin composition RC may be provided by a method such as an ink-jet printing method or a dispensing method. The resin composition RC may have a shear viscosity of about 8 mPa·s to about 50 mPa·s as measured at a temperature of 25° C. according to JIS Z8803, and an apparent extensional viscosity of about 100 mPa·s or less under the conditions of a temperature of about 25° C. and a Hencky strain of about 6. Accordingly, the resin composition RC may be easily discharged through a nozzle NZ, and may be provided to be applied to a uniform thickness.

A preliminary adhesive member P-AP formed by applying the resin composition RC to a uniform thickness may be irradiated with ultraviolet light UV. FIG. 5B illustrates that the preliminary adhesive member P-AP is directly irradiated with the ultraviolet light UV, but the embodiment of the present invention is not limited thereto. A carrier film (not shown) may be disposed on the preliminary adhesive member P-AP, and the carrier film (not shown) transmits ultraviolet light and may cover the preliminary adhesive member P-AP during an ultraviolet curing process.

The adhesive member AP may be formed after the ultraviolet curing of the preliminary adhesive member P-AP. The adhesive member AP formed by removing the substrate CF used during the process may have a storage modulus of about 0.05 MPa to less than 0.2 MPa at about −20° C., and a 180° peel force of about 800 gf/25 mm or greater. Accordingly, the adhesive member AP according to an embodiment may exhibit properties of having high adhesion reliability.

The adhesive member AP manufactured through the steps illustrated in FIG. 5A to FIG. 5C may be applied to the above-described display device DD. For example, one surface of the adhesive member AP may be attached on the display module DM, and then the window WP may be subsequently attached on the other surface of the adhesive member AP which faces the one surface of the adhesive member AP attached to the display module DM. In another embodiment, one surface of the adhesive member AP may be attached on one surface of the window WP, which is to face the display module DM, and then the other surface of the adhesive member AP which faces the one surface of the adhesive member AP attached to the window WP may be attached to the display module DM to provide the adhesive member AP to the display device DD.

Figure 6A:
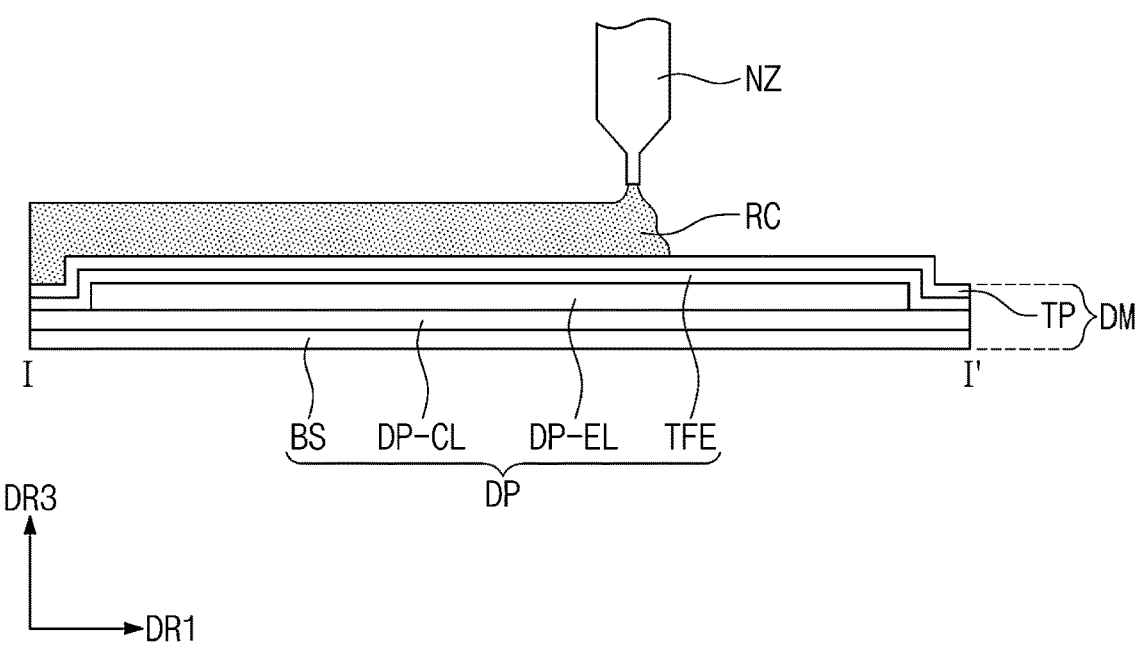
FIG. 6A is a view showing a method for manufacturing an adhesive member of an embodiment.
Figure 6B:
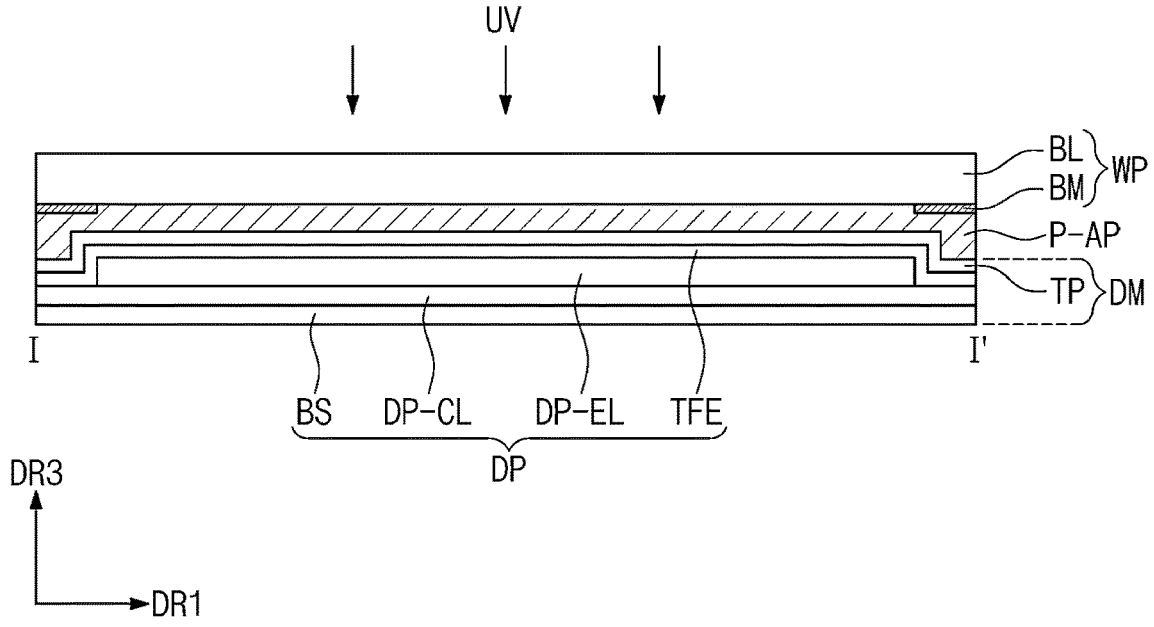
FIG. 6B is a view showing a method for manufacturing an adhesive member of an embodiment.

In an embodiment, a liquid resin composition provided between the display module DM and the window WP may be cured to form the adhesive member AP. FIG. 6A and FIG. 6B schematically show steps of a method for manufacturing the adhesive member AP to be included in the display device DD, which is manufactured by a method different from the method for manufacturing the adhesive member AP described with reference to FIG. 5A to FIG. 5C.

FIG. 6A shows a step of providing the resin composition RC on the display module DM. In addition, FIG. 6B shows a step of irradiating the preliminary adhesive member P-AP formed from the resin composition RC with ultraviolet light UV. The adhesive member AP may be formed by irradiating the preliminary adhesive member P-AP with ultraviolet light UV.

The resin composition RC may be provided by a method such as an ink-jet printing method or a dispensing method. The resin composition RC of an embodiment may have a shear viscosity of about 8 mPa·s to about 50 mPa·s at a temperature of about 25° C., and an apparent extensional viscosity of about 100 mPa·s or less under the conditions of a temperature of about 25° C. and a Hencky strain of about 6. Accordingly, the resin composition RC of an embodiment may be easily discharged from the discharge device (e.g. nozzle NZ), and may be applied to a uniform thickness without flowing out of the display module DM.

The resin composition RC discharged from the nozzle NZ may have a first discharge rate and a second discharge rate.

The resin composition RC may be discharged from the nozzle NZ at the first discharge rate, and then the discharge of the resin composition RC may be stopped. After the discharge is stopped and then a predetermined period of time (e.g., 60 seconds to 300 seconds) has elapsed, the discharge is resumed. At this time, the resin composition RC may be discharged from the nozzle NZ at the second discharge rate. In an embodiment, an amount of change in the second discharge rate of the resin composition RC with respect to the first discharge rate thereof may be 20% or less. For example, the first discharge rate and the second discharge rate may each independently be 5.5 m/s to 6.5 m/s, respectively. The resin composition RC having an amount of change of 20% or less in the second discharge rate with respect to the first discharge rate may exhibit properties of having high discharge stability.

On the preliminary adhesive member P-AP provided by applying the resin composition RC to a uniform thickness, the window WP may be provided. The ultraviolet light UV for curing the resin composition RC may transmit the window WP and be provided to the preliminary adhesive member P-AP. The preliminary adhesive member P-AP may be polymerized and then cured by the provided ultraviolet light UV to be formed as the adhesive member AP. The adhesive member AP according to an embodiment may have a storage modulus of about 0.05 MPa to less than 0.2 MPa at about –20° C., and a 180° peel force of about 800 gf/25 mm or greater for a polymer substrate. Accordingly, the adhesive member AP formed from the resin composition RC of an embodiment may exhibit properties of having high adhesion reliability.

In another embodiment, unlike what is illustrated in FIG. 6B, the ultraviolet light UV may be provided to the preliminary adhesive member P-AP before the window WP is provided on the preliminary adhesive member P-AP, so that a polymerization reaction may proceed in the resin composition RC. The amount of the provided ultraviolet light UV may be an amount of light which may completely cure the resin composition RC. In an embodiment, the resin composition RC may be partially subjected to a polymerization reaction while being in the state of the preliminary adhesive member P-AP, and then after the window WP is provided, unreacted resin composition RC may be further reacted to form the adhesive member AP.

The display device DD (see FIG. 1A) of an embodiment includes the adhesive member AP including a polymer derived from the resin composition RC, and thus, may maintain the adhesive state of the window WP and the display module DM without the lift-off of the adhesive member AP even in the folding region FA.

Figure 7:
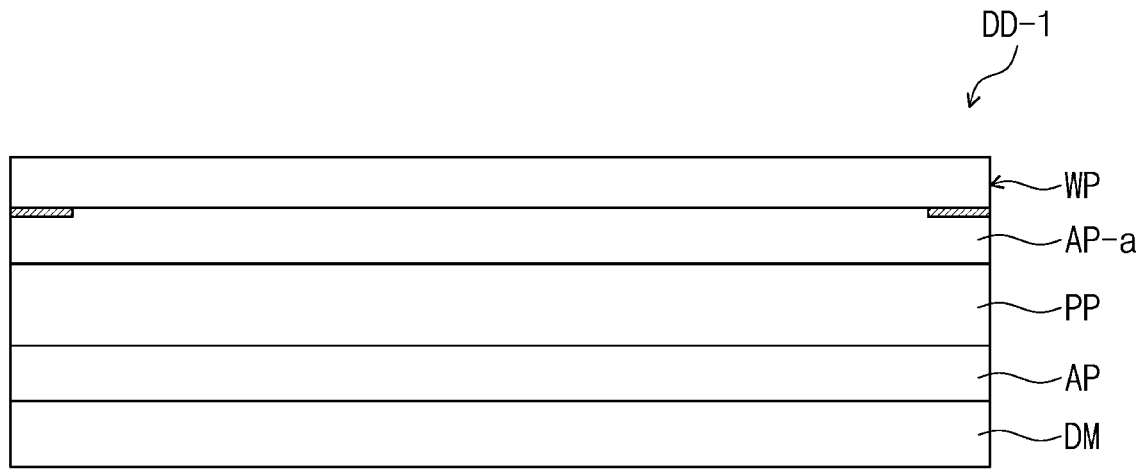
FIG. 7 is a cross-sectional view of a display device of an embodiment.

FIG. 7 is a cross-sectional view showing a display device according to an embodiment. Hereinafter, in the description of the display device of an embodiment illustrated in FIG. 7, the same contents as those described above with reference to FIG. 1A to FIG. 6B will not be described again, and instead, differences will be mainly described.

Compared to the display device DD described with reference to FIG. 2 and FIG. 3, a display device DD-1 illustrated in FIG. 7 may further include a light control layer PP and an optical adhesive layer AP-a. The display device DD-1 of an embodiment may further include the light control layer PP disposed between the adhesive member AP and the window WP, and the optical adhesive layer AP-a disposed between the light control layer PP and the window WP.

The light control layer PP may be disposed on the display panel DP to control reflective light in the display panel DP by external light. The light control layer PP may include, for example, a polarizing layer or a color filter layer.

The optical adhesive layer AP-a may be an optically clear adhesive ("OCA") film or an optically clear adhesive ("OCR") resin layer. The optical adhesive layer AP-a may also be formed from the resin composition of an embodiment as in the case of the adhesive member AP (see FIG. 3) of an embodiment. The optical adhesive layer AP-a may include a polymer derived from a resin composition including at least two monofunctional (meth)acrylates, at least one bifunctional (meth)acrylate, and at least one photoinitiator.

The resin composition of an embodiment may have a shear viscosity of about 8 mPa·s to about 50 mPa·s as measured at a temperature of about 25° C. according to JIS Z8803, and an apparent extensional viscosity of about 100 mPa·s or less under the conditions of a temperature of about 25° C. and a Hencky strain of about 6. The optical adhesive layer AP-a formed from the resin composition of an embodiment may have a storage modulus of about 0.05 MPa to less than 0.2 MPa at about –20° C., and a 180° peel force of about 800 gf/25 mm or greater for a polymer substrate. Accordingly, the optical adhesive layer AP-a disposed between the light control layer PP and the window WP may exhibit properties of having high adhesion reliability. In addition, the display device DD-1 including the optical adhesive layer AP-1 and the adhesive member AP may exhibit excellent reliability even when folding and unfolding are repeated.

Figure 8:
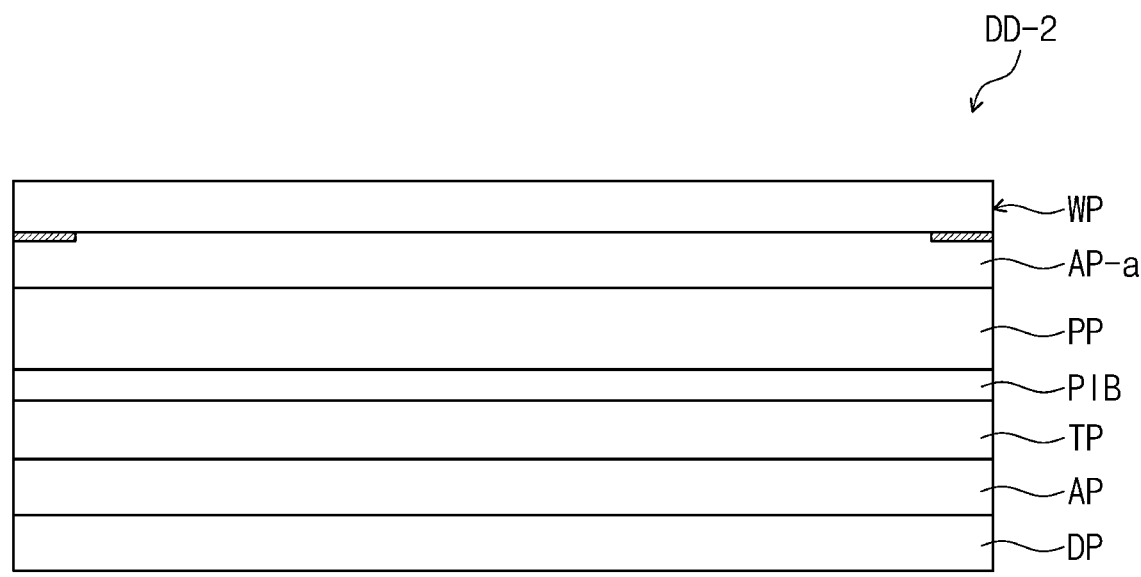
FIG. 8 is a cross-sectional view of a display device of another embodiment.

FIG. 8 is a cross-sectional view showing a display device according to another embodiment. Hereinafter, in the description of the display device of an embodiment illustrated in FIG. 8, the same contents as those described above with reference to FIG. 1A to FIG. 7 will not be described again, and instead, differences will be mainly described.

Compared to the display device DD described with reference to FIG. 2 and FIG. 3, a display device DD-2 of an embodiment illustrated in FIG. 8 may further include the light control layer PP, the optical adhesive layer AP-a, and an interlayer adhesive layer PIB. The display device DD-2 of an embodiment may further include the light control layer PP disposed between the adhesive member AP and the window WP, and the optical adhesive layer AP-a disposed between the light control layer PP and the window WP, as in the case of the display device DD-1 of an embodiment illustrated in FIG. 7.

In the display device DD-2 of an embodiment, the adhesive member AP may be provided between the display panel DP and the input sensing unit TP. That is, the input sensing unit TP is not directly disposed on the display panel DP, but instead, the display panel DP and the input sensing unit TP may be coupled by the adhesive member AP. For example, the adhesive member AP may be disposed between the encapsulation layer TFE (see FIG. 3) of the display panel DP and the input sensing unit TP.

Below the light control layer PP, the interlayer adhesive layer PIB may be provided. The interlayer adhesive layer PIB is disposed between the input sensing unit TP and the light control layer PP, and may be formed of an adhesive material having excellent moisture permeability prevention properties. For example, the interlayer adhesive layer PIB may be formed by including polyisobutylene. The interlayer adhesive layer PIB may be disposed on the input sensing unit TP to prevent the corrosion of sensing electrodes of the input sensing unit TP.

The display device DD-2 of an embodiment includes the optical adhesive layer AP-a and the adhesive member AP formed from the resin composition of an embodiment, and the display device DD-2 including the optical adhesive layer AP-a and the adhesive member AP may exhibit excellent reliability when folding and unfolding are repeated.

Hereinafter, referring to Examples and Comparative Examples, a resin composition, an adhesive member, and a display device according to an embodiment of the present invention will be described in detail. In addition, Examples below are for illustrative purposes only to facilitate the understanding of the present invention, and thus, the scope of the present invention is not limited thereto.

EXAMPLES

1. Preparation of Resin Composition

Resin compositions of Examples and Comparative Examples were prepared according to blending ratios listed in Tables 1 and 2. Materials listed in Tables 1 and 2 were provided to a heat-resistant light-shielding container in respective weight ratios. In addition, as a photoinitiator, Omnirad 819 (IGM Resin Co., Ltd.) and Chivacure TPO-L (Chitec Technology Co., Ltd.) were mixed at a weight ratio of 3:7, and provided in an amount of 4 wt % based on the total weight of the resin composition. Thereafter, each of the resin compositions of Examples and Comparative Examples was prepared by stirring at room temperature such that the resin composition is uniformly mixed.

UN6304: urethane acrylate with a molecular weight of 10000 (Negami Chemical Industrial)

4-HBA: 4-hydroxybutyl acrylate, (Osaka Organic Chemical Industry Ltd.)

2-EHA: 2-ethylhexyl acrylate, (Toagosei Co., Ltd)

IDAA: iso-decyl acrylate, (Osaka Organic Chemical Industry Ltd.)

THF-A: tetrahydrofurfuryl acrylate, (KYOEISHA CHEMICAL Co., Ltd.)

EHDG-AT: 2-ethylhexyl-diglycol acrylate, (KYOEISHA CHEMICAL Co., Ltd.)

Viscoat #260: 1,9-nonanediol diacrylate, (Osaka Organic Chemical Industry Ltd.)

Anti-oxygen inhibitor: triphenyl phosphite, (JOHOKU CHEMICAL Co., Ltd.)

In Tables 1 and 2, UF-C051, UF-C052, UN6207, and UN6304 each correspond to a bifunctional (meth)acrylate. In Tables 1 and 2, 4-HBA, 2-EHA, IDAA, THF-A, and EHDG-AT each correspond to a monofunctional (meth) acrylate. The anti-oxygen inhibitor is to prevent the interference of oxygen during the polymerization reaction of the composition, and Viscoat #260 corresponds to a crosslinking agent.

2. Evaluation of Physical Properties of Resin Composition and Adhesive Member Formed from Resin Composition 1

TABLE 1

| Materials | Example 1 | Example 2 | Example 3 | Example 4 | Example 5 | Example 6 |
|---|---|---|---|---|---|---|
| UF-C051 | 11.7 | — | — | — | — | — |
| UF-C052 | — | — | — | — | 4 | — |
| UN6207 | — | 7 | 8.8 | 4 | — | 4.0 |
| UN6304 | — | 4 | 4 | 10 | 6 | 6.0 |
| 4-HBA | 24 | 15 | 7 | 6.8 | 7 | 7.0 |
| 2-EHA | 64 | 56 | 48 | 43.5 | 55.5 | 55.5 |
| IDAA | — | — | — | — | — | — |
| THF-A | — | 8.8 | 15 | 14.5 | 15.3 | 15.3 |
| EHDG-AT | — | 9 | 17 | 21 | 12 | 12.0 |
| Viscoat#260 | 0.3 | — | — | — | — | — |
| Anti-oxygen inhibitor | — | 0.2 | 0.2 | 0.2 | 0.2 | 0.2 |

TABLE 2

| Materials | Comparative Example 1 | Comparative Example 2 | Comparative Example 3 | Comparative Example 4 |
|---|---|---|---|---|
| UF-C051 | 14.5 | 15.5 | 10.0 | — |
| UF-C052 | — | — | — | — |
| UN6207 | — | — | — | 10.0 |
| UN6304 | — | — | — | — |
| 4-HBA | 24.0 | 22.3 | — | — |
| 2-EHA | 47.8 | 62.0 | — | 90.0 |
| IDAA | 13.5 | — | — | — |
| THF-A | — | — | — | — |
| EHDG-AT | — | — | 90.0 | — |
| Viscoat#260 | 0.2 | 0.2 | — | — |
| Anti-oxygen inhibitor | — | — | — | — |

<Data on Materials of Table 1 and Table 2>

UF-C051: urethane acrylate with a molecular weight of 35000 (KYOEISHA CHEMICAL Co., Ltd.)

UF-C052: urethane acrylate with a molecular weight of 10000 (KYOEISHA CHEMICAL Co., Ltd.)

UN6207: urethane acrylate with a molecular weight of 27000 (Negami Chemical Industrial)

In Table 3 below, the shear viscosity, elongation viscosity, and discharge stability of the resin composition of each of Examples 1 to 5 of Table 1 and Comparative Examples 1 to 3 of Table 2, and the storage modulus and peel force value of an adhesive member formed from the resin composition were measured and shown. The measurement of the shear viscosity, the measurement of the apparent extensional viscosity, and the evaluation of the discharge stability of the resin composition, and the measurement of the storage modulus, and the measurement of the peel force of the adhesive member were performed as follows.

[Method for Measuring Shear Viscosity]

The shear viscosity of the resin composition described in the present disclosure was measured at a temperature of 25° C. according to JIS Z8803, and was measured under a 10 revolutions per minute (rpm) rate condition using a viscometer TVE-25L (TOKI SANGYO Co., Ltd.).

[Method for Measuring Elongation Viscosity]

Using a capillary breakup extensional rheometer (model name CaBER1, Thermo Fisher Scientific Inc.), the measurement was conducted under the conditions of a temperature of 25° C., a diameter of each of an upper plate and a lower plate of 4 mm, an initial gap of 1 mm, a pulling distance of the upper plate of 3.5 mm, a pulling time of the upper plate of 30 ms (millisecond), and a measurement time of 1 second. The obtained diameter-time curve was data-converted to obtain an apparent extensional viscosity-strain curve. An apparent extensional viscosity at a strain of 6 in the apparent extensional viscosity-strain curve was recorded.

[Method for Measuring Storage Modulus]

On a slide glass (slide glass S1112, Matsunami Glass Ind., Ltd.), a release-treated PET film (product name NP100A, PANAC Co., Ltd.), and a silicon rubber sheet (a product of Tigers Polymer Corporation) having a hole with a diameter of 8 mm were sequentially laminated. 28 microliters (μL) of the prepared resin composition are dropped into the hole of the silicon rubber sheet, and using UV LED lamps having peaks at wavelengths of 405 nm and 365 nm, respectively, ultraviolet light was irradiated such that accumulated amounts of light were 220 millijoules per square centimeters (mJ/cm$^2$) and 380 mJ/cm$^2$, respectively. After the irradiation of ultraviolet light, the release-treated PET film (product name NP100A, PANAC Co., Ltd.) and the slide glass (slide glass S1112, Matsunami Glass Ind., Ltd.) were sequentially laminated. Using a UV LED lamp having a peak at a wavelength of 395 nm, the resin composition was cured by

[Method for Measuring Peel Force]

The prepared liquid resin composition was applied to a thickness of 50 μm on a soda-lime glass (Central Glass Co., Ltd.) having a size of 26 mm×76 mm using an inkjet device. As the inkjet device, DevicePrinter-CX (MICROJET Corporation) installed with KM1024i (Konica Minolta, Inc.) was used.

Using UV LED lamps having peaks at wavelengths of 405 nm and 365 nm, respectively, the soda lime glass on which the liquid resin composition was applied was irradiated with ultraviolet light such that accumulated amounts of light were 220 mJ/cm$^2$ and 380 mJ/cm$^2$, respectively. A PET film (Toyobo Co., Ltd., product name A4360, thickness 50 μm) cut to a size of 20 mm×150 mm was provided on the soda lime glass irradiated with ultraviolet light, and was bonded thereto by being applied with a pressure of 0.15 MPa. Thereafter, the resin composition was cured by irradiating ultraviolet light using a UV LED lamp having a peak of 395 nm on the side of the PET film such that an accumulated amount of light was 4000 mJ/cm$^2$ to obtain a sample. The peel force of the obtained sample was measured three times using a universal testing machine (Instron Corporation, product 5965 type) at a rate of 300 mm per minute to achieve a peeling angle of 180°. An average value of about 50 mm peeling was obtained, and the obtained value was multiplied by 1.25 to record a peel force with respect to a width of 25 mm.

[Evaluation of Discharge Stability]

As the inkjet device, DevicePrinter-CX (MICROJET Corporation) installed with KM1024i (Konica Minolta, Inc.) was used. The voltage, pulse driving period, and temperature of the device were adjusted such that the discharge rate was 5.5 m/s to 6.5 m/s. The discharge was performed under the obtained discharge conditions, and then the discharge was stopped for 60 seconds, 120 seconds, and 300 seconds, respectively, before the discharge was resumed to confirm with the naked eye a state in which there was no discharge from the nozzle (non-discharge), a state in which droplets were bent and discharged (flying bend), and the like. The longest time for normal discharge was recorded, and the failure to re-discharge after 60 seconds was denoted by "X."

TABLE 3

| Classifications | Example 1 | Example 2 | Example 3 | Example 4 | Example 5 | Comparative Example 1 | Comparative Example 2 | Comparative Example 3 |
|---|---|---|---|---|---|---|---|---|
| Shear viscosity (25° C., mPa · s) | 20 | 14 | 18 | 21 | 8 | 29 | 32 | 11 |
| Elongation viscosity (25° C., mPa · s) | 82.9 | 72.6 | 74.1 | 88.2 | 78.5 | 113.9 | 110.1 | 68.8 |
| Storage modulus (MPa) | 0.2 | 0.13 | 0.13 | 0.09 | 0.11 | 0.25 | 0.16 | 0.09 |
| Peel force (gf/25 mm) | 1300 | 1100 | 1300 | 1100 | 970 | 2000 | 1700 | 400 |
| Discharge stability (sec) | 120 | 300 | 300 | 120 | 300 | X | X | 300 | irradiating ultraviolet light on the laminated slide glass to obtain a measurement sample with a diameter of 8 mm and a thickness of 500 μm. The storage modulus of the obtained sample was measured according to JIS K7244-7. More specifically, the storage modulus of the sample was measured using a viscoelasticity meter MCR302 (a product of Anton-Paar) under the conditions of a temperature of 20° C. and a frequency of 1 Hz.

Referring to Table 3, the resin composition of each of Examples 1 to 5, which is the resin composition of an embodiment, has a shear viscosity of 8 mPa·s to 50 mPa·s at a temperature of 25° C., and an apparent extensional viscosity of 100 mPa·s or less under the conditions of a temperature of 25° C. and a Hencky strain of 6. It can be seen that the resin composition of each of Examples 1 to 5 has a storage modulus of 0.05 MPa to less than 0.2 MPa at a temperature of −20° C., and a 180° peel force of 800 gf/25 mm or greater. In addition, it can be seen that the resin composition of each of Examples 1 and 4 is discharged at a uniform rate after 60 seconds to 120 seconds have elapsed, and the resin composition of each of Examples 2, 3, and 5 for the resin compositions of Examples 1 to 4 and Comparative Examples 1 and 2, and the adhesive members formed from the resin compositions, the shear viscosity, storage modulus, peel force, and discharge stability are the same as those in Table 3.

TABLE 4

| Classifications | Example 1 | Example 2 | Example 3 | Example 4 | Example 6 | Comparative Example 1 | Comparative Example 2 | Comparative Example 4 |
|---|---|---|---|---|---|---|---|---|
| Shear viscosity (25° C., mPa · s) | 20 | 14 | 18 | 21 | 13.0 | 29 | 32 | 11 |
| Maximum elongation viscosity (25° C., mPa · s) | 226.1 | 155.4 | 160.3 | 150.8 | 131 | 371.0 | 1249.6 | 129.0 |
| Elongation viscosity/shear viscosity | 11.3 | 11.1 | 8.9 | 7.2 | 10.0 | 12.7 | 39.1 | 11.7 |
| Storage modulus (MPa) | 0.2 | 0.13 | 0.13 | 0.09 | 0.11 | 0.25 | 0.16 | 0.09 |
| Peel force (gf/25 mm) | 1300 | 1100 | 1300 | 1100 | 970 | 2000 | 1700 | 400 |
| Discharge stability (sec) | 120 | 300 | 300 | 120 | 300 | X | X | 300 | is discharged at a uniform rate after 60 seconds to 300 seconds have elapsed. Accordingly, the resin composition of an embodiment may have excellent discharge stability, and the adhesive member formed from the resin composition may exhibit properties of having high adhesion reliability. A display device including the adhesive member of an embodiment may exhibit excellent reliability.

Meanwhile, it can be seen that the resin composition of Comparative Example 3 which includes one monofunctional (meth)acrylate has a 180° peel force of less than 800 gf/25 mm. The resin composition of each of Comparative Examples 1 and 2 has an apparent extensional viscosity of greater than 100 mPa·s under the conditions of a temperature of 25° C. and a Hencky strain of 6, and it can be seen that the resin composition was not re-discharged after about 60 seconds have elapsed. It can be seen that the resin composition of Comparative Example 1 has a storage modulus of 0.2 MPa or greater at a temperature of −20° C.

3. Evaluation of Physical Properties of Resin Composition and Adhesive Member Formed from Resin Composition 2

In Table 4 below, the shear viscosity, elongation viscosity, and discharge stability of the resin composition of each of Examples 1 to 4, and 6 of Table 1 and Comparative Examples 1, 2, and 4 of Table 2, and the storage modulus and peel force value of an adhesive member formed from the resin composition were measured and shown.

The measurement of the shear viscosity, the measurement of the elongation viscosity, and the evaluation of the discharge stability of the resin composition, and the measurement of the storage modulus, and the measurement of the peel force of the adhesive member were performed in the same manner as in Table 3, and the maximum elongation viscosity of the resin composition was a maximum value of the elongation viscosity recorded in the apparent extensional viscosity-strain curve obtained by the method for measuring an elongation viscosity. In Table 4, the "elongation viscosity/shear viscosity" is a value obtained by dividing the maximum elongation viscosity by the shear viscosity. In addition, in Table 4, among the measurement and evaluation results Referring to Table 4, the resin composition of each of Examples 1 to 4, and 6, which is the resin composition of an embodiment, has a shear viscosity of 8 mPa·s to 50 mPa·s at a temperature of 25° C., and has a value obtained by dividing the maximum elongation viscosity by the shear viscosity of less than 12. It can be seen that the resin composition of each of Examples 1 to 4, and 6 has a storage modulus of 0.05 MPa to less than 0.2 MPa at a temperature of −20° C., and a 180° peel force of 800 gf/25 mm or greater. In addition, it can be seen that the resin composition of each of Examples 1 and 4 is discharged at a uniform rate after 60 seconds to 120 seconds have elapsed, and the resin composition of each of Examples 2, 3, and 6 is discharged at a uniform rate after 60 seconds to 300 seconds have elapsed. Accordingly, the resin composition of an embodiment may have excellent discharge stability, and the adhesive member formed from the resin composition may exhibit properties of having high adhesion reliability. A display device including the adhesive member of an embodiment may exhibit excellent reliability.

Meanwhile, it can be seen that the resin composition of Comparative Example 4 has a 180° peel force of less than 800 gf/25 mm. The resin composition of Comparative Example 4 includes one monofunctional (meth)acrylate.

The resin composition of an embodiment may have a shear viscosity of 8 mPa·s to 50 mPa·s at a temperature of 25° C., and an apparent extensional Viscosity of 100 mPa·s or less under the conditions of a temperature of 25° C. and a Hencky strain of 6. The resin composition may include at least two monofunctional (meth) acrylates, at least one bifunctional (meth)acrylate, and at least one photoinitiator. Accordingly, the resin composition of an embodiment may be discharged at a uniform rate and in a uniform amount, and the display device of an embodiment including the adhesive member derived from the resin composition may exhibit excellent reliability.

The method for manufacturing an adhesive member of an embodiment includes a step of providing a resin composition, and an amount of change in a second discharge rate with respect to a first discharge rate of the resin composition may be 20% or less. The second discharge rate may be a discharge rate of the resin composition at the time when the discharge is resumed after the resin composition is discharged at the first discharge rate, and then 60 seconds to 300 seconds has elapsed after the discharge is stopped. The method for manufacturing an adhesive member including the step of providing the resin composition having an amount of change of 20% or less in the second discharge rate with respect to the first discharge rate may exhibit properties of having high manufacturing reliability. In addition, the adhesive member formed from the resin composition of an embodiment may exhibit properties of having high adhesion reliability.

A resin composition of an embodiment satisfies a shear viscosity range at a temperature of 25° C. and an apparent extensional viscosity range less under the conditions of a temperature of 25° C. and a Hencky strain of 6, and thus, has excellent discharge stability, and may exhibit properties of having high adhesion reliability after curing.

A method for manufacturing an adhesive member of an embodiment includes a step of providing a resin composition having high discharge stability, and thus, may exhibit properties of having high manufacturing reliability.

A display device of an embodiment includes an adhesive member formed from a resin composition, and thus, may exhibit properties of having high reliability.

Although the present invention has been described with reference to preferred embodiments of the present invention, it will be understood by those skilled in the art that various modifications and changes in form and details may be made therein without departing from the spirit and scope of the present invention as set forth in the following claims.

Accordingly, the technical scope of the present invention is not intended to be limited to the contents set forth in the detailed description of the specification, but is intended to be defined by the appended claims.

What is claimed is:

1. A resin composition comprising:
at least two monofunctional (meth)acrylates;
at least one bifunctional (meth)acrylate; and
at least one photoinitiator,
wherein the resin composition has a shear viscosity of about 8 millipascal seconds (mPa·s) to about 50 mPa·s as measured at a temperature of about 25 degrees in Celsius (° C.) according to JIS Z8803, and an apparent extensional viscosity of greater than 0 mPa·s and less than or equal to about 100 mPa·s under conditions of the temperature of about 25° C. and a Hencky strain of about 6,
wherein after ultraviolet curing, the resin composition has a storage modulus of about 0.05 megapascals (MPa) to less than 0.2 MPa as measured at about –20° C. according to JIS K7244-7, and
wherein after ultraviolet curing, has a 180° peel force of about 970 gf/25 mm to about 1300 gf/25 mm, wherein the 180° peel force is a peel force for a polymer substrate.

2. The resin composition of claim 1, wherein the resin composition satisfies Equation 1 below:

$$Y_1/Y_2 < 12 \qquad \text{[Equation 1]}$$

wherein in Equation 1 above, $Y_1$ is a maximum value of the apparent extensional viscosity of the resin composition as measured at the temperature of about 25° C., and $Y_2$ is the shear viscosity of the resin composition as measured at the temperature of about 25° C. according to JIS Z8803.

3. The resin composition of claim 1, wherein a sum of weights of the monofunctional (meth)acrylates is about 80 percentages by weight (wt %) to about 90 wt % based on a total weight of the resin composition.

4. The resin composition of claim 1, wherein the bifunctional (meth)acrylate comprises a urethane (meth)acrylate having a weight average molecular weight of about 10000 to less than 40000.

5. The resin composition of claim 1, wherein a weight of the bifunctional (meth)acrylate is about 10 wt % to about 20 wt % based on a total weight of the resin composition.

6. The resin composition of claim 1, wherein the monofunctional (meth)acrylates each independently comprise at least one of 4-hydroxybutyl acrylate,2-ethylhexyl acrylate, tetrahydrofurfuryl acrylate, or 2-ethylhexyl-diglycol acrylate.

7. The resin composition of claim 1, wherein:
when a discharge pressure is applied to the resin composition, the resin composition has a first discharge rate,
after the discharge pressure is removed and then about 60 seconds to about 300 seconds elapse, the discharge pressure is re-applied to the resin composition,
when the discharge pressure is re-applied, the resin composition has a second discharge rate, and
an amount of change in the second discharge rate with respect to the first discharge rate is greater than 0% and less than or equal to about 20 percentages (%).

8. The resin composition of claim 7, wherein the first discharge rate and the second discharge rate are each about 5.5 meters per second (m/s) to about 6.5 m/s.

9. A method for manufacturing an adhesive member, the method comprising:
providing a resin composition including at least two monofunctional (meth)acrylates, at least one bifunctional (meth)acrylate, and at least one photoinitiator, on a substrate using a discharge device; and
providing light to the resin composition to form an adhesive member,
wherein when a discharge pressure is applied to the resin composition from the discharge device, the resin composition has a first discharge rate, and when the discharge pressure is removed, and then the discharge pressure is again applied to the resin composition after about 60 seconds to about 300 seconds elapse, the resin composition has a second discharge rate,
wherein an amount of change in the second discharge rate with respect to the first discharge rate is greater than 0% and less than or equal to about 20%, and
wherein the resin composition has an apparent extensional viscosity of greater than 0 mPa·s and less than or equal to about 100 mPa·s under conditions of the temperature of about 25° C. and a Hencky strain of about 6.

10. The method of claim 9, wherein the resin composition has a shear viscosity of about 8 mPa·s to about 50 mPa·s as measured at a temperature of about 25° C. according to JIS Z8803, and an apparent extensional viscosity of greater than 0 mPa·s and less than or equal to about 100 mPa·s under conditions of the temperature of about 25° C. and a Hencky strain of about 6.

11. The method of claim 9, wherein the first discharge rate and the second discharge rate are each about 5.5 m/s to about 6.5 m/s.

12. A display device comprising:
a display panel;
a window disposed on the display panel; and
an adhesive member disposed between the display panel and the window, wherein the adhesive member includes a polymer derived from a resin composition including at least two monofunctional (meth)acrylates, at least one bifunctional (meth)acrylate, and at least one photoinitiator, wherein the resin composition has a shear viscosity of about 8 mPa·s to about 50 mPa·s as measured at a temperature of about 25° C. according to JIS Z8803, and an apparent extensional viscosity of greater than 0 mPa·s and less than or equal to about 100 mPa·s under conditions of the temperature of about 25° C. and a Hencky strain of about 6, wherein the adhesive member has a storage modulus of about 0.05 MPa to less than 0.2 MPa as measured at about −20° C. according to JIS K7244-7, and wherein the adhesive member has a 180° peel force of about 970 gf/25 mm to about 1300 gf/25 mm for a polymer substrate.

13. The display device of claim 12, wherein the resin composition satisfies Equation 1 below:

$$Y_1/Y_2 < 12 \qquad \text{[Equation 1]}$$

wherein in Equation 1 above, $Y_1$ is a maximum value of the apparent extensional viscosity of the resin composition as measured at the temperature of about 25° C., and $Y_2$ is the shear viscosity of the resin composition as measured at the temperature of about 25° C. according to JIS Z8803.

14. The display device of claim 12, wherein a sum of weights of the monofunctional (meth)acrylates is about 80 wt % to about 90 wt % based on a total weight of the resin composition.

15. The display device of claim 12, wherein the bifunctional (meth)acrylate comprises a urethane (meth)acrylate having a weight average molecular weight of about 10000 to less than 40000.

16. The display device of claim 12, wherein the adhesive member is formed by providing the resin composition on one surface of the window or on one surface of the display panel, and then photocuring the resin composition.

17. The display device of claim 12, comprising at least one folding region, wherein the folding region has a radius of curvature of greater than 0 mm and less than or equal to about 5 millimeters (mm).

\* \* \* \* \*